July 11, 1961
W. E. RIKER
2,992,420
CAPACITY TYPE BURGLAR ALARM SYSTEMS
Filed Nov. 8, 1957
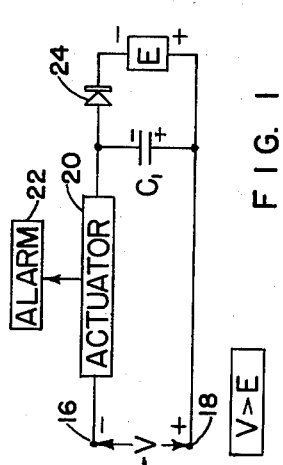
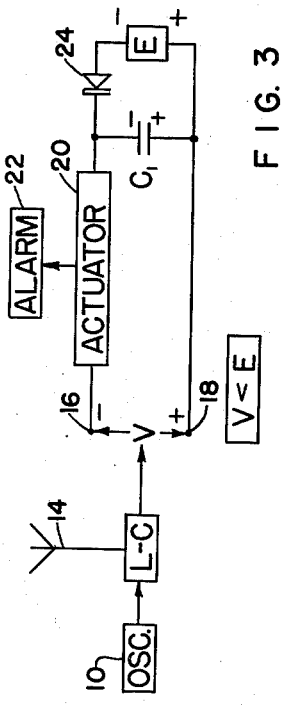
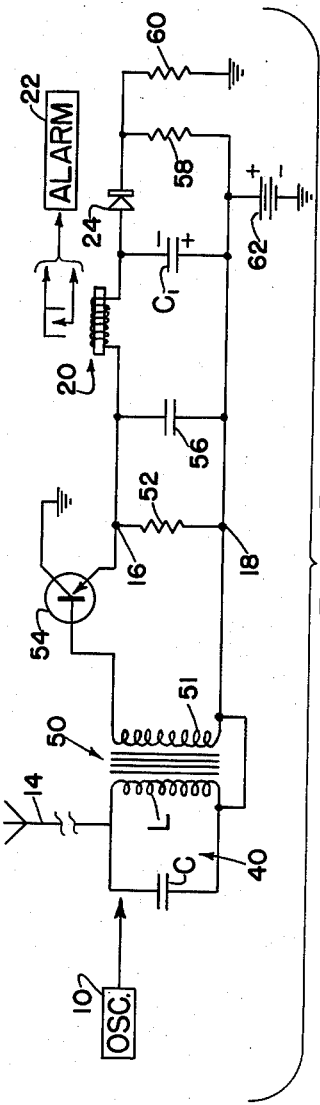
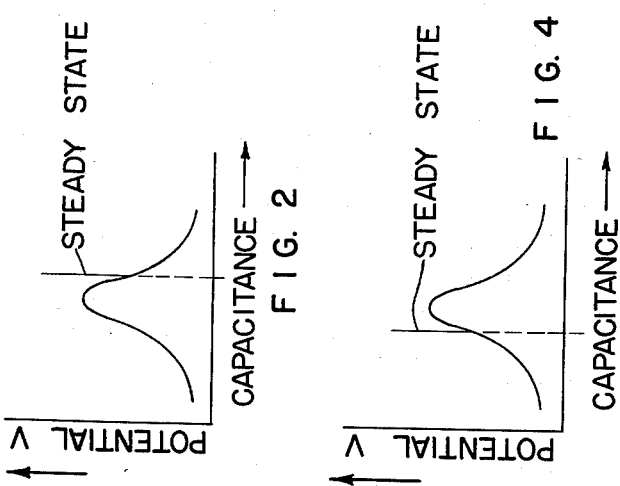
INVENTOR.
WILLIAM E. RIKER
BY
Thomas J. Greer Jr.
ATTORNEY

United States Patent Office 2,992,420
Patented July 11, 1961

2,992,420
CAPACITY TYPE BURGLAR ALARM SYSTEMS
William E. Riker, Wantagh, N.Y., assignor to Holmes Electric Protective Company, New York, N.Y., a corporation of New York
Filed Nov. 8, 1957, Ser. No. 695,279
2 Claims. (Cl. 340—276)

This invention relates to a device for detecting a change in the capacitance of a circuit and exhibits special utility in a burglar alarm system. A part of the system, known in the art as an L-C circuit, is linked to an area or space which is to be protected against unauthorized entry. The body of an intruder in the area effects a change in the capacitance of the L-C circuit, unknown to the intruder, and by a suitable arrangement of components this change in capacitance manifests itself as a change in a potential. Measurement of the potential change thereby indicates the presence of the intruder.

Often the capacitance change to be noted at the protected area is very small, sometimes being in the order of only a few micromicrofarads, and accordingly a burglar alarm system which is to detect such small changes must be extremely sensitive. Providing a system which initially exhibits the desired sensitivity is not difficult, but after installation difficulties often begin to appear in the form of false alarms. For example, the capacitance within the protected area will change due to changes in the temperature and relative humidity of the atmosphere. Without some modification in the system, these changes in relative humidity could cause an alarm. In addition, changes in capacitance occur with aging of various circuit components. Obviously, it is undesirable that a system should give an alarm upon such changes.

To overcome these difficulties it has been the practice to introduce into the system a circuit which will compensate for changes due to such factors. Such a circuit is known as a rate-of-change circuit and nullifies the alarm indicating action of the system for capacity changes which are slower than those usually caused by an intruder. While performing its intended function, the provision of the rate of change circuit introduces an undesirable feature, i.e., an unauthorized person may enter the protected area without causing an alarm to be given if his entry is slow enough.

By the present invention a modification of the system is made which causes it to be also responsive in an absolute manner while retaining the advantages of the rate of change circuit. This modification precludes the possibility of changes beyond a predetermined amount in the capacitance within the protected area going undetected, no matter how slowly they may take place.

It is therefore an object of this invention to provide an improved device of the character described which is efficient in operation, inexpensive to manufacture, and dependable throughout its life.

In the drawings:
FIG. 1 is a partly schematic illustration of one embodiment of the invention;
FIG. 2 is a resonance curve of the L-C circuit of FIG. 1 and shows the relationship of potential to capacitance;
FIG. 3 is a partly schematic illustration of another embodiment of the invention;
FIG. 4 is a resonance curve of the L-C circuit of FIG. 3; and
FIG. 5 is a more detailed showing of the embodiment of FIG. 1.

Referring now to FIG. 1 of the drawings, the numeral 10 denotes an oscillator of fixed frequency which drives a parallel L-C circuit. An element 14, linked to the L-C circuit, is placed within the protected area and may assume the form of an antenna distributed about the area or connection to an object such as a safe. Any change in the capacitance between element 14 and the ground, as would be caused by an intruder in the protected area, causes a change in the capacitance of the L-C circuit. The L-C circuit represents an impedance to the driving oscillator circuit and this impedance depends upon the circuit's resistance, inductance, capacitance and the driving frequency of the oscillator 10. For all practical purposes, the resistance, inductance and driving frequency are constant and hence the impedance is a function only of the capacitance. Thus a change in capacitance within the protected area changes the impedance of the L-C circuit. By measuring the potential drop across the inductance of the L-C circuit, by any conventional means as a by a transformer and rectifier, the presence of an intruder in the protected area is translated into a potential. This potential is denoted by V and appears across terminals 16 and 18 and in the direction indicated by the plus and minus signs.

The steady state relationship between the oscillator driving frequency, the resonant frequency of the L-C circuit, and the output potential V is such that an increase in capacitance of element 14 results in a decrease in potential V, as is illustrated in FIG. 2.

In series across terminals 16 and 18 is an actuating element denoted by the numeral 20 and a capacitance denoted by $C_1$. The actuating element 20 is coupled to an alarm 22 and the passage of current in either direction through the actuating element initiates the action of the alarm. The alarm 22 may be at or near the protected area or may be at a point remote therefrom, as in a central station. A diode rectifier 24 and a source of potential E, the latter having the direction as shown by the plus and minus signs, are connected in series across the capacitor $C_1$.

The operation of the circuit shown in FIG. 1 is as follows. V is normally greater than E yet current cannot flow from terminal 18 through the actuator element to terminal 16 because it cannot pass through capacitor $C_1$ and further because it cannot pass in this direction through the rectifier 24. The actuating element 20 is thus unexcited. The capacitor $C_1$ becomes charged by an amount equal to the potential V.

For small changes in the potential V which take place over a relatively long period of time the actuating element 20 is not affected because the capacitance $C_1$ prevents appreciable current flow through the actuating element. If however there should be a rapid change in the potential V, the capacitor allows appreciable current to flow through and hence actuate the element 20.

Upon an entry into the protected area the operation is as follows. The capacitance of element 14 rapidly increases and V rapidly diminishes. Because the potential across the capacitance is changing rapidly, $C_1$ discharges rapidly and sufficient current flows through the actuator element 20 to excite it with the consequent action of the alarm 22.

Should however the entry be extremely slow the change in V will also be slow and hence the rate of discharge of the capacitance $C_1$ would be such that a current insufficient to excite it would flow through the actuator element 20. This behavior could continue until $C_1$ was completely discharged, thus yielding no system protection against intruders who entered slowly. To prevent such an occurrence, the diode rectifier 24 begins to conduct sufficient actuating current to the element 20 as soon as V becomes lower than E, thus eventually precluding the defeat of the system. This current is due to the potential E which, normally lower than the potential V, now flows in the direction of E through the rectifier.

Referring now to FIG. 3 of the drawings, a modification is shown which differs from that of FIG. 1 in the direction of the rectifier 24 and the normal magnitude of the potential V. The reason for these differences may best be explained by reference to FIG. 4. If the relationship between the driving frequency, the resonant frequency of the L-C circuit and the potential V is such than an increase in capacitance of 14 causes an increase in V (distinguished from the circuit of FIG. 1 wherein it caused a decrease in V), then the direction of the rectifier 24 must be reversed. Only a brief consideration of the circuit of FIG. 1 is necessary to see that by reversing the direction of the rectifier 24, with the steady state or normal value of V less than E, the new circuit will yield the same desired functions as the old. The following analysis of the circuit of FIG. 3 will make this clear.

In the steady state or normal condition E is larger than V and due to the action of the rectifier there is no current through the actuator element 20. Similarly, there can be no current through the capacitor $C_1$ in the steady state. As before, $C_1$ charges to the potential V.

For a rapid entry, the operation is substantially the same as that of the circuit of FIG. 1, the capacitor $C_1$ supplying the current to excite the actuator element 20.

Upon a slow entry into the protected area, the capacitance of 14 will increase and V will increase. If V becomes sufficiently greater than E, there will be enough current flowing in the direction of V through the diode rectifier 24 to excite the actuating element 20.

Referring now to FIG. 5 of the drawings, the circuit shown represents a reduction to practice of portions of the circuit of FIG. 1. The numeral 10 represents an oscillator of fixed frequency which drives an L-C circuit 40 having a capacitance C and inductance L. The numeral 14 denotes an antenna located in a protected area and one end thereof is connected to the L-C circuit. By this arrangement any change in capacity in the protected area manifests itself as a change in the capacitance in the L-C circuit.

The numeral 50 denotes a transformer of conventional construction the input coil of which is the inductance L. One end of the transformer output coil 51 is connected to the base of transistor 54 whose collector is grounded and whose emitter is connected to terminal 16. The other end of output coil 51 is secured to terminal 18. A resistance 52 is connected between terminals 16 and 18 and a smoothing capacitor 56 is also secured across terminals 16 and 18.

For so much of the circuit described, the oscillator 10 drives the L-C circuit 40 at a frequency slightly different from its resonant frequency. The connections between the output coil 51, transistor 54, smoothing capacitor 56 and resistance 52 transform the output of the transformer into a D.C. potential V across terminals 16 and 18 having a direction from 18 to 16. Any change in the capacitance within the protected area thus manifests itself as a change in the potential V, as illustrated in FIG. 2.

The numeral 20 denotes a relay having a winding and contacts and is connected to an alarm 22 so that upon the former's actuation an alarm will be given. The alarm may be either near the protected area or in a central station.

Capacitor $C_1$ and diode rectifier 24, the latter here assuming the form of a small semi-conductor rectifier, are connected as shown. Resistance 60 is connected in series with resistance 58 and has one end grounded. The positive side of battery 62 is connected to terminal 18 and has its negative side grounded. Resistances 58 and 60 form a voltage divided and the IR drop from battery 62 through resistance 58 supplies the potential E of FIG. 1.

Reconsideration of the description of the embodiment of FIG. 1, together with the above description, will suffice to understand the operation of the circuit of FIG. 5 and hence further explanation is deemed unnecessary.

In practice the circuits described are provided with means for adjusting the circuit parameters to yield the operation shown in either FIG. 2 or FIG. 4 and also with means for testing the response of the system.

I claim:

1. In a capacity type burglar alarm system: a first D.C. source of potential, said source changing from a normal magnitude to another magnitude in response to a condition to be sensed; actuating means excitable by the passage of current therethrough for initiating an alarm in response to a change in said first potential; a capacitor across said source for precluding the operation of said actuating means for changes in said potential below a predetermined rate; means for exciting the actuating means upon a predetermined value of said first potential regardless of its rate of change, said last mentioned means including a second D.C. source having a magnitude different from the normal magnitude of the first source and a rectifier element for controlling the current from the said second D.C. source to excite the actuating means only after the first potential source equals the second potential source in the former's change upon responding to the condition to be sensed.

2. In a capacity type burglar alarm system, a first D.C. source of potential which changes from a normal magnitude to another magnitude in response to a condition to be sensed, an actuating element sensitive to the passage of current therethrough and a capacitor both in series across said source of potential, a rectifier element in series with a second D.C. source of potential, said rectifier element and said second source of potential being connected across said capacitor, said first and second D.C. sources opposing one another and being normally of different magnitudes, said rectifier element permitting current to flow in that direction which current would flow due to the normally lower values of the two sources of potential.

References Cited in the file of this patent

UNITED STATES PATENTS

| | | |
|---|---|---|
| 2,799,015 | Bell | July 9, 1957 |
| 2,804,268 | Davis | Aug. 27, 1957 |
| 2,832,950 | Snyder | Apr. 29, 1958 |